(12) United States Patent
Miller et al.

(10) Patent No.: US 8,215,100 B2
(45) Date of Patent: Jul. 10, 2012

(54) REGENERATION DEVICE HAVING EXTERNAL CHECK VALVE

(75) Inventors: Robert L. Miller, Dunlap, IL (US); Stephen M. Wiley, East Peoria, IL (US); Glenn B. Cox, Peoria, IL (US); Thomas Randall McClure, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 894 days.

(21) Appl. No.: 12/071,893

(22) Filed: Feb. 27, 2008

(65) Prior Publication Data
US 2008/0209895 A1    Sep. 4, 2008

Related U.S. Application Data

(60) Provisional application No. 60/904,373, filed on Mar. 2, 2007.

(51) Int. Cl.
*F01N 3/00* (2006.01)
(52) U.S. Cl. ........... 60/286; 60/293; 60/300; 60/303; 123/525; 123/550; 123/467; 701/103
(58) Field of Classification Search .......... 60/273, 60/274, 285–287, 295–301; 123/525, 527, 123/531–535, 518, 519, 520, 467; 701/103
See application file for complete search history.

(56) References Cited

U.S. PATENT DOCUMENTS

| | | | | |
|---|---|---|---|---|
| 2,635,425 A | * | 4/1953 | Thorpe et al. | 60/39.27 |
| 3,690,093 A | * | 9/1972 | Carlisle | 60/726 |
| 4,128,997 A | * | 12/1978 | Suzuki et al. | 60/274 |
| 4,502,278 A | * | 3/1985 | Stark | 60/303 |
| 4,533,316 A | | 8/1985 | Takino et al. | |
| 4,622,811 A | | 11/1986 | Distel et al. | |
| 4,787,349 A | | 11/1988 | Hilger | |
| 4,834,043 A | | 5/1989 | Kaczynski et al. | |
| 4,987,738 A | * | 1/1991 | Lopez-Crevillen et al. | 60/286 |
| 5,001,899 A | | 3/1991 | Santiago et al. | |
| 5,177,958 A | * | 1/1993 | Clemens et al. | 60/293 |
| 5,243,816 A | * | 9/1993 | Huddas | 60/39.094 |
| 5,273,020 A | * | 12/1993 | Hayami | 123/520 |
| 5,417,059 A | * | 5/1995 | Hartel et al. | 60/276 |

(Continued)

FOREIGN PATENT DOCUMENTS

EP    1655463    5/2006

(Continued)

*Primary Examiner* — Thomas Denion
*Assistant Examiner* — Jesse Bogue
(74) *Attorney, Agent, or Firm* — Finnegan, Henderson, Farabow, Garrett & Dunner LLP

(57) ABSTRACT

An exhaust treatment device for a combustion system is disclosed. The exhaust treatment device may have a housing, and an injector disposed within the housing to deliver an injection fluid into a flow of exhaust. The exhaust treatment device may also have at least one fluid supply passage that is disposed within the housing and being in fluid communication with the injector to supply the injector with injection fluid. The exhaust treatment device may further have at least one purge passage disposed within the housing and in fluid communication with the injector to supply the injector with a purge fluid. The exhaust treatment device may additionally have a first valve element that is mounted to the housing and disposed at an entrance of the at least one purge passage The first valve element may be configured to provide a unidirectional flow of purge fluid to the at least one purge passage.

26 Claims, 5 Drawing Sheets

U.S. PATENT DOCUMENTS

| | | | |
|---|---|---|---|
| 5,701,732 A * | 12/1997 | Nesbitt et al. | 60/776 |
| 5,771,689 A * | 6/1998 | Bareis et al. | 60/286 |
| 5,881,550 A * | 3/1999 | Toelle | 60/39.094 |
| 6,125,624 A | 10/2000 | Prociw | |
| 6,250,065 B1 * | 6/2001 | Mandai et al. | 60/776 |
| 6,289,869 B1 | 9/2001 | Elliott | |
| 6,438,963 B1 * | 8/2002 | Traver et al. | 60/779 |
| 6,439,191 B1 | 8/2002 | Elliott | |
| 6,470,673 B1 * | 10/2002 | van Nieuwstadt et al. | 60/274 |
| 6,688,533 B2 | 2/2004 | Nines et al. | |
| 7,017,335 B2 * | 3/2006 | Huber et al. | 60/286 |
| 2004/0173190 A1 * | 9/2004 | Makino | 123/520 |
| 2005/0150221 A1 * | 7/2005 | Crawley et al. | 60/295 |
| 2005/0252201 A1 | 11/2005 | Lecea et al. | |
| 2005/0284136 A1 | 12/2005 | Plougmann | |
| 2006/0016198 A1 * | 1/2006 | Stuttaford et al. | 60/776 |
| 2006/0101810 A1 | 5/2006 | Angelo et al. | |
| 2006/0156733 A1 | 7/2006 | Prociw et al. | |
| 2007/0000241 A1 * | 1/2007 | Funke et al. | 60/295 |
| 2008/0016851 A1 | 1/2008 | McCarthy et al. | |
| 2008/0022663 A1 | 1/2008 | Dodge et al. | |
| 2008/0034734 A1 | 2/2008 | Karkkainen et al. | |
| 2008/0078172 A1 | 4/2008 | Miller et al. | |

FOREIGN PATENT DOCUMENTS

| | | |
|---|---|---|
| EP | 1683967 | 7/2006 |
| JP | 61-119918 A | 6/1986 |
| JP | 95-018549 B | 3/1995 |

* cited by examiner

REGENERATION DEVICE HAVING EXTERNAL CHECK VALVE

RELATED APPLICATION

This application is based upon and claims the benefit of priority from U.S. Provisional Application No. 60/904,373 filed on Mar. 2, 2007, the entire contents of which are incorporated herein by reference.

TECHNICAL FIELD

The present disclosure is directed to a regeneration device and, more particularly, to a regeneration device having an external check valve.

BACKGROUND

Engines, including diesel engines, gasoline engines, gaseous fuel powered engines, and other engines known in the art exhaust a complex mixture of air pollutants. These air pollutants include solid material known as particulate matter or soot. Due to increased attention on the environment, exhaust emission standards have become more stringent and the amount of particulate matter emitted from an engine is regulated depending on the type of engine, size of engine, and/or class of engine.

One method implemented by engine manufacturers to comply with the regulation of particulate matter exhausted to the environment has been to remove the particulate matter from the exhaust flow of an engine with a device called a particulate trap. A particulate trap is a filter designed to trap particulate matter and typically consists of a wire mesh or ceramic honeycomb medium. However, the use of the particulate trap for extended periods of time may cause the particulate matter to build up in the medium, thereby reducing the functionality of the filter and subsequent engine performance.

The collected particulate matter may be removed from the filter through a process called regeneration. To initiate regeneration of the filter, the temperature of the particulate matter entrained within the filter must be elevated to a combustion threshold, at which the particulate matter is burned away. One way to elevate the temperature of the particulate matter is to inject a catalyst such as diesel fuel into the exhaust flow of the engine and ignite the injected fuel.

After the regeneration event, the supply of fuel is shut off. However, some fuel may remain within the fuel injector or the fuel lines that direct fuel to the injector. This remaining fuel, when subjected to the harsh conditions of the exhaust stream may coke or be partially burned, leaving behind a solid residue that can restrict or even block the fuel injector. In addition, it may be possible for particulate matter from the exhaust flow to enter and block the injector. For this reason, it may be necessary to periodically purge the injector of fuel and/or any built up residue or particulate matter between regeneration events.

One method of purging a fuel injector is described in U.S. Pat. No. 4,987,738 (the '738 patent) issued to Lopez-Crevillen et al. on Jan. 29, 1991. Specifically, the '738 patent discloses a particulate filter having a burner used to incinerate trapped particulates. The burner includes a fuel injector nozzle for injecting fuel into the burner during regeneration, and a fuel pump that supplies fuel to the injector nozzle. In order to maintain efficient and reliable operation of the burner, a supply of purge air is directed to the fuel injector nozzle following each regeneration event to purge the nozzle of fuel. Purge air continues to flow through the injector nozzle until a subsequent regeneration event.

Although the burner of the '738 patent may benefit somewhat from the purging process described above, the gain may be limited. In particular, although the purge air may remove some of the liquid fuel present in the injector to prevent buildup, the purge air may contain water vapor and other harmful substances that can corrode surfaces of the injector and/or it's housing. When passageways in the injector and/or housing are normally dry (e.g., filled with purge air), the water vapor entrained within the purge air has the potential to cause significant corrosion of the injector. This water vapor can also generate debris that can clog the injector and other components. This corrosion can shorten the life of the injector and/or housing.

The exhaust treatment device of the present disclosure solves one or more of the problems set forth above.

SUMMARY OF THE DISCLOSURE

One aspect of the present disclosure is directed to an exhaust treatment device. The exhaust treatment device may include a housing, and an injector disposed within the housing to deliver an injection fluid into a flow of exhaust. The exhaust treatment device may also include at least one fluid supply passage disposed within the housing and being in fluid communication with the injector to supply the injector with injection fluid. The exhaust treatment device may further have at least one purge passage disposed within the housing and in fluid communication with the injector to supply the injector with a purge fluid. The exhaust treatment device may additionally have a first valve element mounted to the housing and disposed at an entrance of the at least one purge passage The first valve element may be configured to provide a unidirectional flow of purge fluid to the at least one purge passage.

Another aspect of the present disclosure is directed to a method of operating an exhaust treatment device. The method may include supplying injection fluid to the exhaust treatment device, and separately supplying purge fluid to the exhaust treatment device in parallel relation to the supply of injection fluid. The method may also include ensuring a unidirectional flow of purge fluid into the exhaust treatment device to purge the exhaust treatment device of injection fluid.

DETAILED DESCRIPTION

Figure 1:
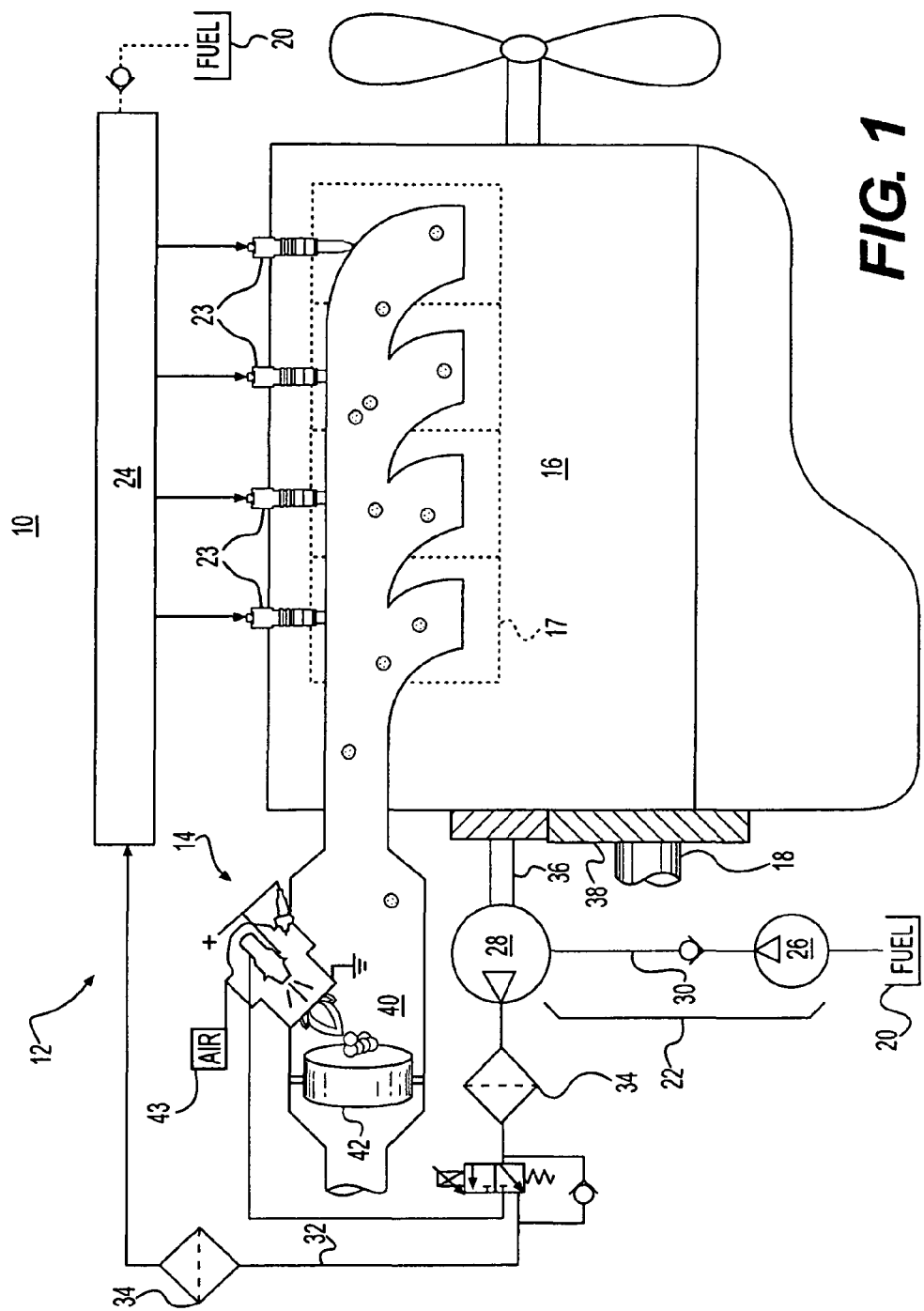
FIG. 1 is a schematic and diagrammatic illustration of an exemplary disclosed power unit.

FIG. 1 illustrates a power unit 10 having a fuel system 12 and an auxiliary regeneration system 14. For the purposes of this disclosure, power unit 10 is depicted and described as a four-stroke diesel engine. One skilled in the art will recognize, however, that power unit 10 may be any other type of internal combustion engine such as, for example, a gasoline or a gaseous fuel-powered engine. Power unit 10 may include an engine block 16 that at least partially defines a plurality of combustion chambers 17. In the illustrated embodiment, power unit 10 includes four combustion chambers 17. However, it is contemplated that power unit 10 may include a greater or lesser number of combustion chambers 17 and that combustion chambers 17 may be disposed in an "in-line" configuration, a "V" configuration, or any other suitable configuration.

As also shown in FIG. 1, power unit 10 may include a crankshaft 18 that is rotatably disposed within engine block 16. A connecting rod (not shown) may connect a plurality of pistons (not shown) to crankshaft 18 so that a sliding motion of each piston within the respective combustion chamber 17 results in a rotation of crankshaft 18. Similarly, a rotation of crankshaft 18 may result in a sliding motion of the pistons.

Fuel system 12 may include components that cooperate to deliver injections of pressurized fuel into each of combustion chambers 17. Specifically, fuel system 12 may be a common rail fuel system and may include a tank 20 configured to hold a supply of fuel, and a fuel pumping arrangement 22 configured to pressurize the fuel and direct the pressurized fuel to a plurality of fuel injectors 23 by way of a rail 24.

Fuel pumping arrangement 22 may include one or more pumping devices that function to increase the pressure of the fuel and direct one or more pressurized streams of fuel to rail 24. In one example, fuel pumping arrangement 22 includes a low pressure source 26 and a high pressure source 28 disposed in series and fluidly connected by way of a fuel line 30. Low pressure source 26 may embody a transfer pump that provides low pressure feed to high pressure source 28. High pressure source 28 may receive the low pressure feed and increase the pressure of the fuel up to as much as 300 MPa in some cases. High pressure source 28 may be connected to rail 24 by way of a fuel line 32. One or more filtering elements 34, such as a primary filter and a secondary filter, may be disposed within fuel line 32 in series relation to remove debris and/or water from the fuel pressurized by fuel pumping arrangement 22.

One or both of low and high pressure sources 26, 28 may be operatively connected to power unit 10 and driven by crankshaft 18. Low and/or high pressure sources 26, 28 may be connected with crankshaft 18 in any manner readily apparent to one skilled in the art where a rotation of crankshaft 18 will result in a corresponding driving rotation of a pump shaft. For example, a pump driveshaft 36 of high pressure source 28 is shown in FIG. 1 as being connected to crankshaft 18 through a gear train 38. It is contemplated, however, that one or both of low and high pressure sources 26, 28 may alternatively be driven electrically, hydraulically, pneumatically, or in any other appropriate manner. It is further contemplated that fuel system 12 may alternatively embody another type of fuel system such as, for example, a mechanical unit fuel injector system or a hydraulic unit fuel injector system where the pressure of the injected fuel is generated or enhanced within individual injectors without the use of a high pressure source.

Auxiliary regeneration system 14 may be associated with an exhaust treatment device 40. In particular, as exhaust from power unit 10 flows through exhaust treatment device 40, exhaust constituents such as particulate matter, NOx, HC, and other constituents may be removed from the exhaust flow or otherwise converted to innocuous gases. In one example, exhaust treatment device 40 may include a wire mesh or ceramic honeycomb filtration medium 42 situated to remove particulate matter from the exhaust flow. Over time, the particulate matter may build up in filtration medium 42 and, if left unchecked, the particulate matter buildup could be significant enough to restrict or even block the flow of exhaust through treatment device 40, allowing backpressure within the power unit 10 to increase. An increase in the backpressure of power unit 10 could reduce the power unit's ability to draw in fresh air, resulting in decreased performance, increased exhaust temperatures, and poor fuel consumption.

Figure 2:
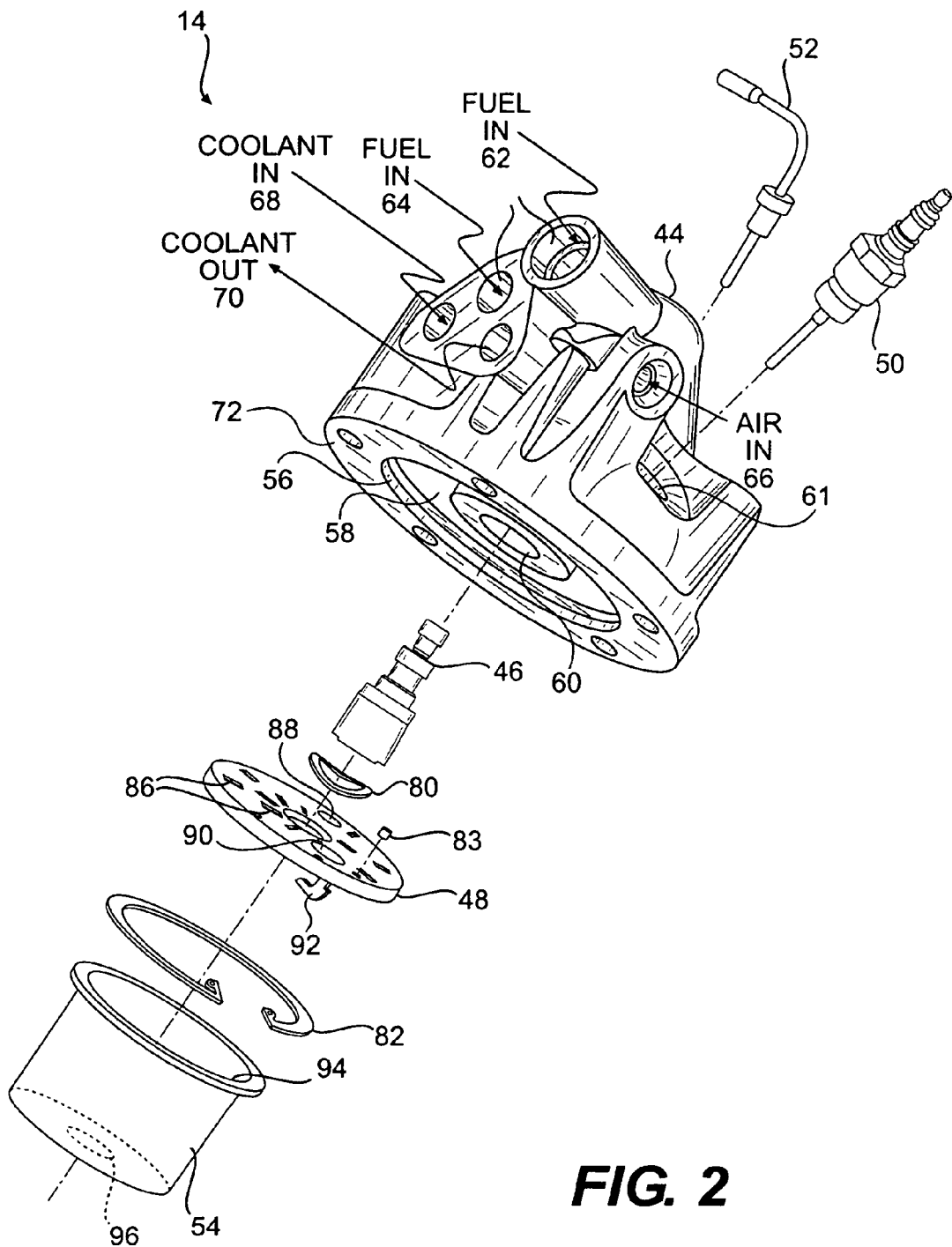
FIG. 2 is an exploded view illustration of an exemplary disclosed exhaust treatment device for use with the power unit of FIG. 1.

As illustrated in FIG. 2, auxiliary regeneration system 14 may include components in fluid communication with fuel pumping arrangement 22 and a supply of purge air 43 to periodically reduce the buildup of particulate matter within exhaust treatment device 40. These components may include, among other things, a housing 44, an injector 46, a mixing plate 48, a spark plug 50, a thermocouple 52, and a combustion canister 54. It is contemplated that auxiliary regeneration system 14 may include additional or different components such as, for example, one or more pilot injectors, additional main injectors, a controller, a pressure sensor, a flow sensor, a flow blocking device, and other components known in the art. It is further contemplated that instead of or in addition to filtration medium 42, exhaust treatment device 40 may include a Selective Catalytic Reduction (SCR) device and an associated injector (not shown) nearly identical to injector 46 for introducing a reductant such as, for example, urea into the exhaust flow upstream of the SCR device.

Housing 44 may receive and fluidly interconnect injector 46, mixing plate 48, spark plug 50, and thermocouple 52. In particular, housing 44 may have a central stepped bore 56, an annular recessed opening 58, a centrally located bore 60, a first radially offset bore 61, and a second radially offset bore 63 (shown only in FIG. 4). Housing 44 may also include a pilot fuel port 62, a main fuel port 64, a purge air supply port 66, and inlet and outlet cooling ports 68 and 70, respectively. Pilot fuel port 62 and main fuel port 64 may be situated to receive pressurized flows of fuel in parallel relation from fuel pumping arrangement 22. Purge air supply port 66 may be situated to receive purge air from supply 43. One or more check valves (not shown) may be situated in any one or all of these passages, if desired, to ensure unidirectional flow of the respective fluids within the passages and/or to minimize the volumes thereof that could require periodic re-supplying or purging.

Figure 3:
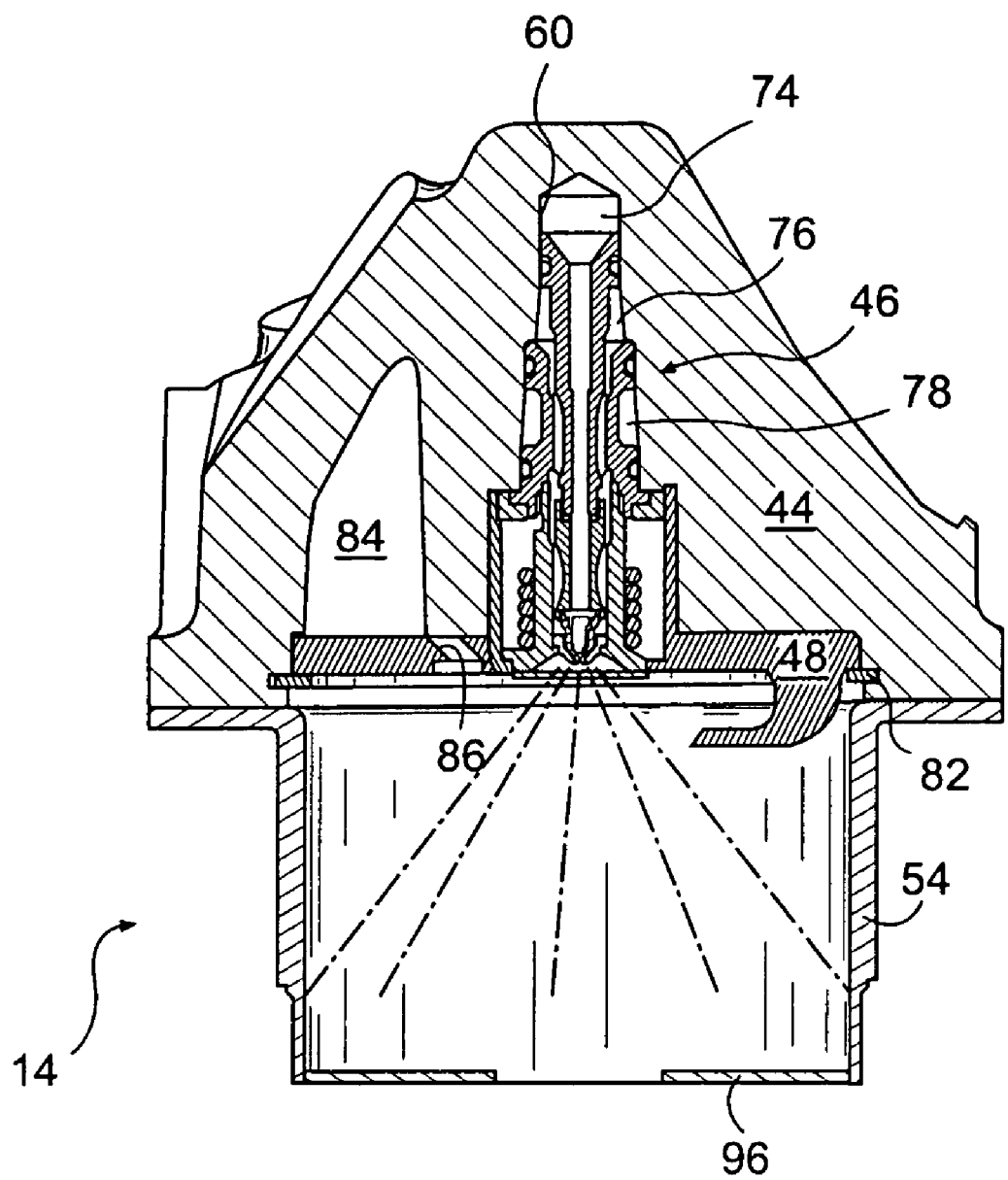
FIG. 3 is a cross-sectional illustration of the exhaust treatment device of FIG. 2.

Centrally located bore 60 may receive injector 46 through an inner surface 72 (referring to the surface of housing 44 illustrated in FIG. 2 as being open to combustion canister 54). Centrally located bore 60, together with injector 46 may form a pilot fuel chamber 74 (referring to FIG. 3), a main fuel chamber 76, and a coolant chamber 78 within the steps of bore 60. Pilot fuel chamber 74 may be fluidly communicated with pilot fuel port 62, while main fuel chamber 76 may be fluidly communicated with main fuel port 64. Coolant chamber 78 may be fluidly communicated with both the inlet and outlet cooling ports 68, 70. Mixing plate 48 may retain injector 46 within centrally located bore 60 by way of a resilient member such as a bellville washer 80.

Central stepped bore 56 may receive mixing plate 48 also through inner surface 72. Mixing plate 48 may be press-fitted completely within central stepped bore 56 and/or held in place with a snap ring 82. Mixing plate 48 may be centrally aligned with injector 46 and housing 44, and angularly oriented with respect to housing 44 by way of one or more dowel pins 83.

First radially offset bore 61 may receive spark plug 50 through an external surface of housing 44. In particular, spark plug 50 may include external threads that engage internal threads of first radially offset bore 61. First radially offset bore 61 may be in communication with air supply port 66, if desired, such that carbon and other contaminates may be periodically purged from bore 61 and, thereby, prevented from building on spark plug 50 and causing unintentional arcing.

Second radially offset bore 63 may receive thermocouple 52 through the external surface of housing 44. Similar to spark plug 50, thermocouple 52 may also have external threads that engage internal threads of second radially offset bore 63. Although no passages are illustrated as communicating fluids with thermocouple 52, it is contemplated that purge fluid such as air from supply 43 may alternatively or additionally be directed to second radially offset bore 63 to minimize the buildup of contaminates therein, if desired.

Injector 46 may be disposed within housing 44 and operable to inject one or more amounts of pressurized fuel (e.g., such as through pilot, main, and/or post injections) into combustion canister 54 at predetermined timings, fuel pressures, and fuel flow rates. The timing of fuel injection into canister 54 may be synchronized with sensory input received from thermocouple 52, one or more pressure sensors (not shown), a timer (not shown), or any other similar sensory devices such that the injections of fuel substantially correspond with a buildup of particulate matter within filtration medium 42 (referring to FIG. 1). For example, fuel may be injected as the temperature of the exhaust flowing through exhaust treatment device 40 exceeds a predetermined value. Alternatively or additionally, fuel may be injected as a pressure of the exhaust flowing through exhaust treatment device 40 exceeds a predetermined pressure level or a pressure drop across filtration medium 42 exceeds a predetermined differential value. It is contemplated that fuel may also be injected on a set periodic basis, in addition to or regardless of pressure and temperature conditions, if desired.

Mixing plate 48 (e.g., a swirl plate), together with annular recessed opening 58 of housing 44, may form an air distribution passage 84 (referring to FIG. 3), which may be supplied with compressed air from purge air supply 43 or another source. Mixing plate 48 may include a plurality of annularly disposed air vents 86 fluidly communicating air distribution passage 84 with combustion canister 54. Air vents 86 may mix air with injections of fuel inside combustion canister 54 to improve combustion therein. It is contemplated that air vents 86 may additionally or alternatively direct pressurized air to the outer periphery of combustion canister 54 for cooling and/or insulating purposes, if desired.

Mixing plate 48 may include openings to accommodate thermocouple 52 and spark plug 50. Specifically, thermocouple 52 may extend into combustion canister 54 via a first through hole 88 in mixing plate 48, while spark plug 50 may extend into combustion canister 54 via a second through hole 90. A grounded electrode 92 may extend from mixing plate 48 proximal second through hole 90 to interact with spark plug 50.

Spark plug 50 may facilitate ignition of fuel sprayed from injector 46 into combustion canister 54. Specifically, during a regeneration event or when a catalyst within exhaust treatment device 40 requires an elevated temperature, the temperature of the exhaust exiting power unit 10 may be too low to cause auto-ignition of the fuel sprayed from injector 46. To initiate combustion of the fuel and, subsequently, the trapped particulate matter, a small quantity (i.e., a pilot shot) of fuel from injector 46 may be sprayed or otherwise injected toward spark plug 50 to create a locally rich atmosphere readily ignitable by spark plug 50. A spark developed between an electrode of spark plug 50 and grounded electrode 92 of mixing plate 48 may ignite the locally rich atmosphere creating a flame, which may be jetted or otherwise advanced toward the trapped particulate matter. The flame jet propagating from injector 46 may raise the temperature within exhaust treatment device 40 to a level that readily supports efficient ignition of a larger quantity (i.e., a main shot) of fuel from injector 46. As the main injection of fuel ignites, the temperature within exhaust treatment device 40 may continue to rise to a level that causes combustion of the particulate matter trapped within filtration medium 42 and/or to a level that supports efficient operation of a catalyst.

Thermocouple 52 may confirm successful ignition of the fuel/air mixture within combustion chamber 54 and help to control an injection quantity of fuel based on an achieved temperature. A thermocouple generally consists of a bi-metal rod inside of a stainless steel shell. When the rod heats up, a direct current is generated that can be measured, and the value of the measured current may be indicative of the temperature in contact with the rod. Thermocouple 52 may extend through mixing plate 48 into combustion canister 54 for indicating the temperature therein. When a temperature measured within combustion canister 54 exceeds a predetermined value, it can be concluded that ignition of the air-fuel mixture has been achieved. Similarly, when the temperature measured within combustion canister 54 drops below the predetermined value, it can be concluded that the flame jet has been extinguished. It is contemplated that the injections of fuel into combustion canister 54, the flow rate or pressure of air directed into combustion canister 54, a temperature of injector 46, and/or other temperature dependent operations may be varied in response to the value of the current generated by thermocouple 52.

Combustion canister 54 (referring to FIG. 2) may embody a tubular member to axially direct an ignited fuel/air mixture (i.e., the flame jet) from auxiliary regeneration system 14 into the exhaust flow of treatment device 40. In particular, combustion canister 54 may include a central opening 94 that fluidly communicates fuel from injector 46 and air from distribution passage 84 with the exhaust flow. Combustion canister 54 may employ a flame stabilizing plate 96 at one end of central opening 94 to provide a restriction that minimizes pulsations within exhaust treatment device 40. That is, the inner diameter of flame stabilizing plate 96 may be less than the inner diameter of central opening 94. Combustion canister 54 may be generally straight and have a predetermined length set during manufacture according to a desired flame introduction location (the distance that a flame resulting from the ignition of the fuel/air mixture extends from combustion canister 54 into the exhaust flow). In one example, this desired introduction location may be about 12 inches from flame stabilizing plate 96 of combustion canister 54.

Figure 4:
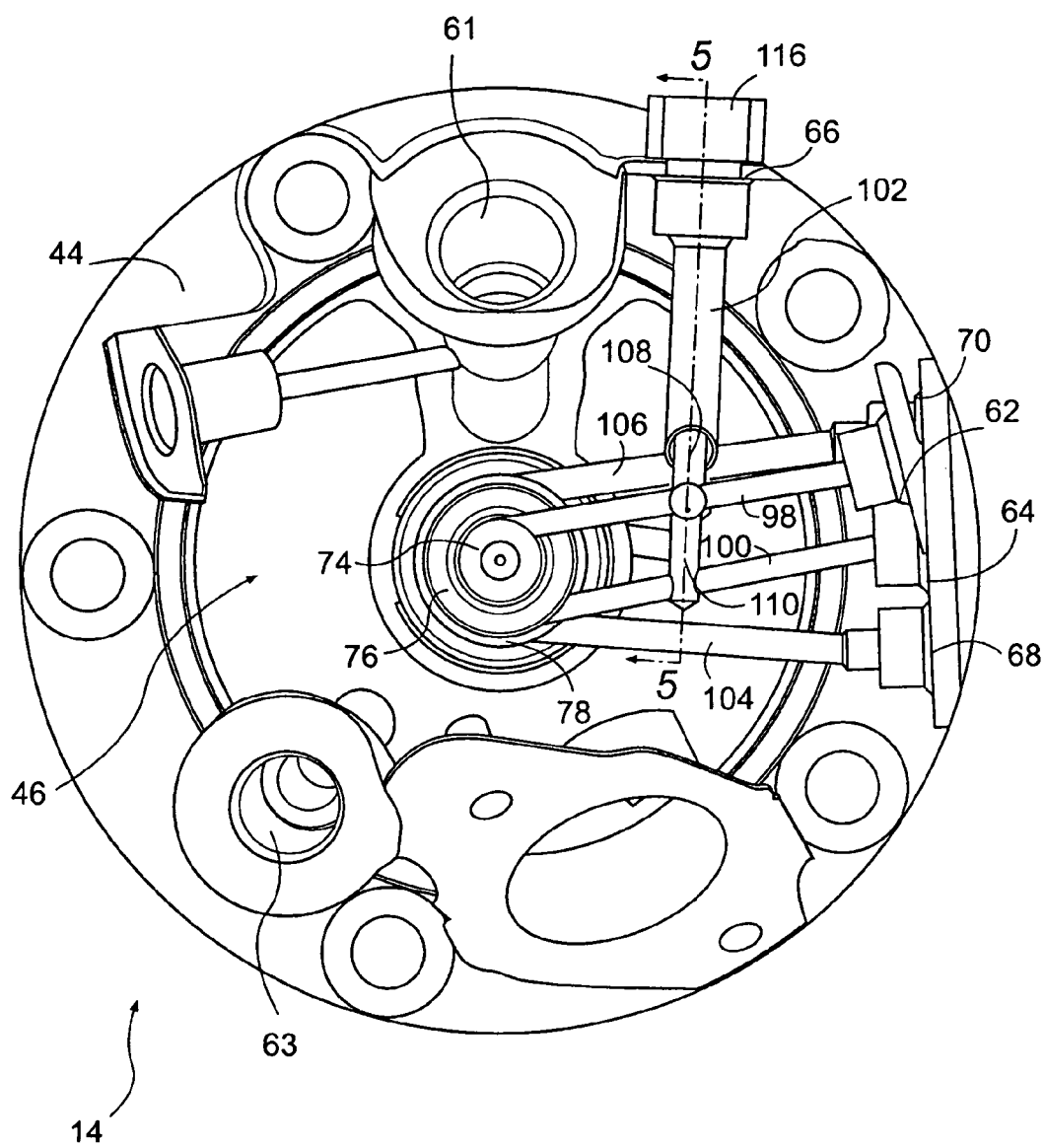
FIG. 4 is a cutaway view illustration of the exhaust treatment device of FIGS. 2 and 3.

As illustrated in FIG. 4, housing 44 may include a plurality of passages connecting ports 62-70 with chambers 74-78. In particular, a pilot supply passage 98 may connect pilot fuel port 62 with pilot chamber 74, while a main supply passage 100 may connect main fuel port 64 with main chamber 76. A purge passage 102 may connect purge air port 66 with both pilot and main supply passages 98, 100. A supply coolant passage 104 may connect inlet coolant port 68 with coolant chamber 78, while a drain coolant passage 106 may connect coolant chamber 78 with outlet coolant port 70. It is contemplated that additional and/or different fluid passages may be included within housing 44, if desired.

Figure 5:
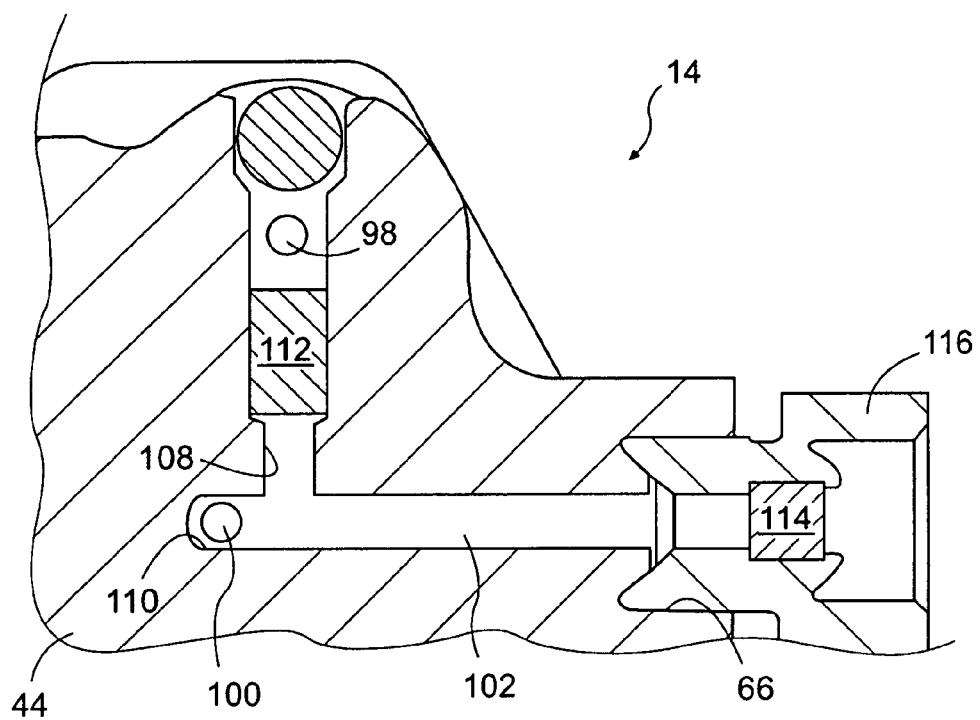
FIG. 5 is a cross-sectional illustration of the exhaust treatment device of FIGS. 2-4.

As illustrated in FIG. 5, purge passage 102 may branch to a pilot purge passage 108 and to a main purge passage 110 within housing 44. Pilot purge passage 108 may communicate purge passage 102 with pilot supply passage 98, while main purge passage 110 may communicate purge passage 102 with main supply passage 100. Pilot purge passage 108 may be substantially orthogonal to main purge passage 110 and, when housing 44 is fully assembled within exhaust treatment device 14, pilot purge passage 108 may be generally vertically oriented with respect to the pull of gravity. In this manner, debris may be prevented from accumulating within pilot purge passage 108.

A check valve 112 may be fixedly disposed within pilot purge passage 108 to ensure unidirectional flow of purge air from pilot purge passage 108 to pilot supply passage 98, while preventing a fuel from flowing between pilot and supply passages 98, 100. That is, check valve 112 may include a spring biased valve mechanism movable from a first or closed position, at which flow through check valve 112 is substantially blocked, against a spring bias toward a second position, at which at which air from purge passage 102 may flow to pilot supply passage 98 via pilot purge passage 108. The spring bias resisting movement of the valve element toward the second position combined with a pressure of fuel within the pilot supply passage 98 may always exert a greater force than the force resulting from the pressure of fuel within main supply passage 100 such that fuel from main supply passage 100 may never be allowed to flow to pilot supply passage 98 as long as fuel is present in pilot supply passage 98 at a required pilot pressure. Similarly, the pressure of fuel within pilot supply passage 98, together with the spring bias of check valve 112 may prevent fuel flow from pilot supply passage 98 to main supply passage 100. The pressure of air within purge passage 102 may be great enough to move the valve element of check valve 112 toward the second position when fuel supply to pilot supply passage 98 has been terminated, thereby allowing purge air to fill pilot supply passage 98, in addition to the substantially unrestricted filling of main supply passage 100. In this manner, fuel from only main supply passage 100 may be allowed into purge passage 102, while purge air may selectively flow through purge passage 102 to both pilot and main supply passages 98, 100.

A check valve 114 may be disposed within purge inlet port 66 to provide unidirectional flow of air into housing 44. Specifically, check valve 114 may be fixedly disposed within an adapter 116, which may be threadingly engaged with purge inlet port 66. Adapter 116 may allow a flow of purge air into purge passage 102, and prevent a flow of purge air and/or fuel from purge passage 102 out of purge inlet port 66. In this manner, an upstream side of check valve 114 may always be in communication with purge air, while a downstream side may be in selective and periodic communication with air and fuel. That is, all of the purge air within purge passage 102 and pilot and main purge passages 108, 110 may be periodically replaced with fuel and, likewise, all of the fuel within these passages and pilot and main supply passages 98, 100 may be periodically replaced with purge air. Adapter 116 may be fabricated from a corrosive resistant material such as, for example, stainless steel.

INDUSTRIAL APPLICABILITY

The regeneration device of the present disclosure may be applicable to a variety of exhaust treatment devices including, for example, particulate traps requiring periodic regeneration, catalytic converters requiring a predetermined temperature for optimal operation, SCR devices requiring the injection of ammonia or another catalyst, and other similar devices known in the art. In fact, the disclosed regeneration device may be implemented into any engine system that benefits from clog-free injector operation with added protection against corrosion. The operation of power unit 10 will now be explained.

Referring to FIG. 1, air and fuel may be drawn into combustion chambers 17 of power unit 10 for subsequent combustion. Specifically, fuel from fuel system 12 may be injected into combustion chambers 17 of power unit 10, mixed with the air therein, and combusted to produce a mechanical work output and an exhaust flow of hot gases. The exhaust flow may contain a complex mixture of air pollutants composed of gaseous and solid material, which can include particulate matter. As this particulate laden exhaust flow is directed from combustion chambers 17 through exhaust treatment device 40, particulate matter may be strained from the exhaust flow by filtration medium 42. Over time, the particulate matter may build up in filtration medium 42 and, if left unchecked, the buildup could be significant enough to restrict, or even block the flow of exhaust through exhaust treatment device 40. As indicated above, the restriction of exhaust flow from power unit 10 may increase the backpressure of power unit 10 and reduce the unit's ability to draw in fresh air, resulting in decreased performance of power unit 10, increased exhaust temperatures, and poor fuel consumption.

To prevent the undesired buildup of particulate matter within exhaust treatment device 40, filtration medium 42 may be regenerated. Regeneration may be periodic or based on a triggering condition such as, for example, an elapsed time of engine operation, a pressure differential measured across filtration medium 42, a temperature of the exhaust flowing from power unit 10, or any other condition known in the art.

To initiate regeneration, injector 46 may be caused to selectively pass fuel into exhaust treatment device 40 at a desired rate. As a pilot injection of fuel from chamber 74 sprays into combustion canister 54, a spark from spark plug 50 may ignite the fuel. As a main injection of fuel from main chamber 76 is passed into exhaust treatment device 40, the burning pilot flow of fuel may ignite the main flow of fuel. The ignited main flow of fuel may then raise the temperature of the particulate matter trapped within filtration medium 42 to the combustion level of the entrapped particulate matter, burning away the particulate matter and, thereby, regenerating filtration medium 42.

Between regeneration events, injector 46 may be selectively purged of fuel and any accumulated buildup to ensure proper operation thereof. Specifically, a pressurized purge fluid such as air from supply 43 (referring to FIG. 1) may be passed through check valve 114, and inlet purge port 66 to force fuel from purge passage 102, pilot and main purge passages 108, 110, pilot and main supply passages 98, 100, and pilot and main fuel chambers 74, 76. The passing of purge air into and throughout housing 44 and injector 46 may be initiated in response to a plurality of triggering conditions such as, among other things, the time elapsed since a previous purge event, a failed regeneration event, and a successful completion of a regeneration event.

The disclosed regeneration device configuration may ensure continued and successful regeneration events by removing residual fuel and buildup therefrom in an efficient manner with components having a prolonged useful life. Specifically, by minimizing the number and volume of dry passages (i.e., those passages never in contact with the injection fluid) within housing 44, corrosion of surfaces within housing 44 caused by water vapor and other substances entrained within the purge air may be minimized. Check valve 114 may help to minimize the number and volume of dry passages within housing 44 by allowing the periodic fuel replacement of all purge air within with housing 44 (i.e., substantially all purge passages from injector 46 up to check valve 114 may be filled with fuel on a periodic basis). That is, because of the placement location of check valve 114 there may be substantially no dry purge passages within housing 44. In addition, all components upstream of check valve 114 that are dry, may be fabricated from a corrosion resistant material. This configuration may help to prolong the component life of housing 44.

The design of exhaust treatment device 14 may also be a low cost solution. In particular, housing 44 may be fabricated from a low cost material that, under dry conditions, would otherwise easily be corroded. However, because the passages of housing 44 may be periodically exposed to fuel, corrosion of these surfaces may not be an issue. The only high cost corrosion resistant materials of exhaust treatment device 14 may be strategically located upstream of check valve 114, where the dry conditions could be problematic. In addition, by making check valve 114 easily removable, a check valve failure might only result in the replacement of adapter 116, rather than the entire housing 44.

It will be apparent to those skilled in the art that various modifications and variations can be made to the regeneration device of the present disclosure without departing from the scope of the disclosure. Other embodiments will be apparent to those skilled in the art from consideration of the specification and practice of the regeneration device disclosed herein. For example, although the disclosed regeneration device is illustrated as drawing pressurized fuel from a fuel system, the disclosed regeneration device may alternatively draw pressurized fuel from a separate dedicated source, if desired. Further, although general examples have illustrated the disclosed regeneration device as being associated with fuel for particulate regeneration purposes, it is contemplated that injector 46 may just as easily be adapted to inject ammonia, AdBlue, and/or urea within a Selective Catalytic Reduction (SCR) device, if desired. It is intended that the specification and examples be considered as exemplary only, with a true scope of the disclosure being indicated by the following claims and their equivalents.

What is claimed is:

1. An exhaust treatment device, comprising:
   a housing;
   an injector disposed within the housing to deliver an injection fluid into a flow of exhaust;
   at least one fluid supply passage disposed within the housing and being in fluid communication with the injector to supply the injector with injection fluid;
   at least one purge passage disposed within the housing and being in fluid communication with the injector to supply the injector with a purge fluid; and
   a first valve element mounted to the housing and being disposed at an entrance of the at least one purge passage, the entrance of the purge passage being formed by a periphery of the housing, and the first valve element being configured to provide a unidirectional flow of purge fluid to the at least one purge passage, wherein the at least one purge passage is in fluid communication with the injector via the at least one fluid supply passage, and the at least one fluid supply passage includes a pilot supply passage and a main supply passage.

2. The exhaust treatment device of claim 1, wherein an upstream side of the first valve element is only exposed to purge fluid, and a downstream side of the first valve element is periodically exposed to injection fluid and purge fluid.

3. The exhaust treatment device of claim 1, wherein a pressure of the injection fluid in the pilot supply passage is almost always greater than a pressure of the injection fluid in the main supply passage.

4. The exhaust treatment device of claim 1, wherein the at least one purge passage branches to a pilot purge passage in fluid communication with the pilot supply passage, and to a main purge passage in fluid communication with the main supply passage, and the first valve element is disposed upstream of the pilot and main purge passages.

5. The exhaust treatment device of claim 4, further including a second valve element disposed within the pilot purge passage to allow a flow of purge fluid into the pilot supply passage, to prevent a flow of injection fluid from the pilot supply passage into the pilot purge passage, and to prevent a flow of injection fluid from the pilot purge passage into the pilot supply passage.

6. The exhaust treatment device of claim 5, wherein the second valve element is fixedly connected to the housing.

7. The exhaust treatment device of claim 4, wherein the pilot purge passage is oriented substantially orthogonal to the main purge passage.

8. The exhaust treatment device of claim 4, wherein the pilot and main purge passages are each periodically filled with injection fluid and purge fluid.

9. The exhaust treatment device of claim 1, wherein the first valve element is removably connected to an entrance port of the housing.

10. The exhaust treatment device of claim 9, further including an adapter fixedly receiving the first valve element and being removably connected to the entrance.

11. The exhaust treatment device of claim 9, wherein the adapter is corrosion resistant.

12. The exhaust treatment device of claim 1, wherein the at least one purge passage branches to a pilot purge passage in fluid communication with a pilot supply passage, and a main purge passage in fluid communication with a main supply passage, the exhaust treatment device further including a second valve element disposed within the pilot purge passage, the second valve element regulating flow into and out of the pilot supply passage.

13. A method of operating an exhaust treatment device, comprising:
   supplying injection fluid to the exhaust treatment device, the supply of injection fluid comprising a pilot flow of injection fluid and a main flow of injection fluid;
   preventing the pilot flow of injection fluid from joining the main flow of injection fluid, and preventing any of the main flow of injection fluid from joining the pilot flow of injection fluid;
   separately supplying purge fluid to the exhaust treatment device in parallel relation to the supply of injection fluid;
   ensuring, with a valve disposed at an entrance to the exhaust treatment device, a unidirectional flow of the supply of purge fluid into the exhaust treatment device; and
   allowing the unidirectional flow of the supply of purge fluid to branch, downstream of the valve, to a pilot flow of purge fluid directed to force the pilot flow of injection fluid from the exhaust treatment device, and to a main flow of purge fluid directed to force the main flow of injection fluid from the exhaust treatment device.

14. The method of claim 13, wherein all purge fluid within the exhaust treatment device is periodically replaced with injection fluid.

15. The method of claim 13, further including directing the pilot flow of injection fluid and the main flow of injection fluid into the exhaust treatment device in parallel relation.

16. The method of claim 15, wherein a pressure of the pilot flow of injection fluid is almost always greater than a pressure of the main flow of injection fluid.

17. An exhaust treatment system configured to receive a flow of exhaust, comprising:

a particulate trap configured to remove particulates from the flow of exhaust; and a regeneration device configured to periodically initiate regeneration of the particulate trap, the regeneration device including:

a supply of fuel;

a supply of purge air;

an injector configured to selectively inject fuel into the flow of exhaust; and a housing disposed to receive in parallel, fluid fuel and air from the supplies of fuel and purge air and being configured to house the injector, the housing including:

a pilot supply passage fluidly communicating the supply of fuel with the injector;

a main supply passage fluidly communicating the supply of fuel with the injector at a pressure lower than the pressure of fuel within the pilot supply passage;

a purge passage fluidly communicating the supply of purge air with the pilot and main supply passages; and a first check valve mounted to the housing at an inlet purge port formed by a periphery of the housing between the supply of purge air and the purge passage, the first check valve being configured to provide a unidirectional flow of purge air into the housing.

18. The exhaust treatment system of claim 17, wherein an upstream side of the first check valve is only exposed to purge air, and a downstream side of the first check valve is periodically exposed to fuel and purge air.

19. The exhaust treatment system of claim 17, wherein the purge passage branches to a pilot purge passage in fluid communication with the pilot supply passage, and to a main purge passage in fluid communication with the main supply passage, wherein the first check valve is disposed upstream of the pilot and main purge passages.

20. The exhaust treatment system of claim 19, further including a second check valve disposed within the pilot purge passage to allow a flow of purge air into the pilot supply passage and to prevent a flow of fuel from the pilot purge passage into the pilot supply passage.

21. The exhaust treatment system of claim 20, wherein the second check valve also prevents a flow of fuel from the pilot supply passage into the main supply passage via the pilot and main purge passages.

22. The exhaust treatment system of claim 20, wherein the second check valve is fixedly connected to the housing.

23. The exhaust treatment system of claim 19, wherein the pilot and main purge passages are each periodically filled with fuel.

24. The exhaust treatment system of claim 17, further including an adapter fixedly receiving the first check valve and being removably connected to the to the inlet purge port.

25. The exhaust treatment system of claim 24, wherein the adapter is corrosion resistant.

26. The exhaust treatment device of claim 17, wherein the purge passage branches to a pilot purge passage in fluid communication with the pilot supply passage, and to a main purge passage in fluid communication with the main supply passage, the exhaust treatment device further including a second check valve disposed within the pilot purge passage, the second check valve regulating flow into and out of the pilot supply passage.

* * * * *